UNITED STATES PATENT OFFICE.

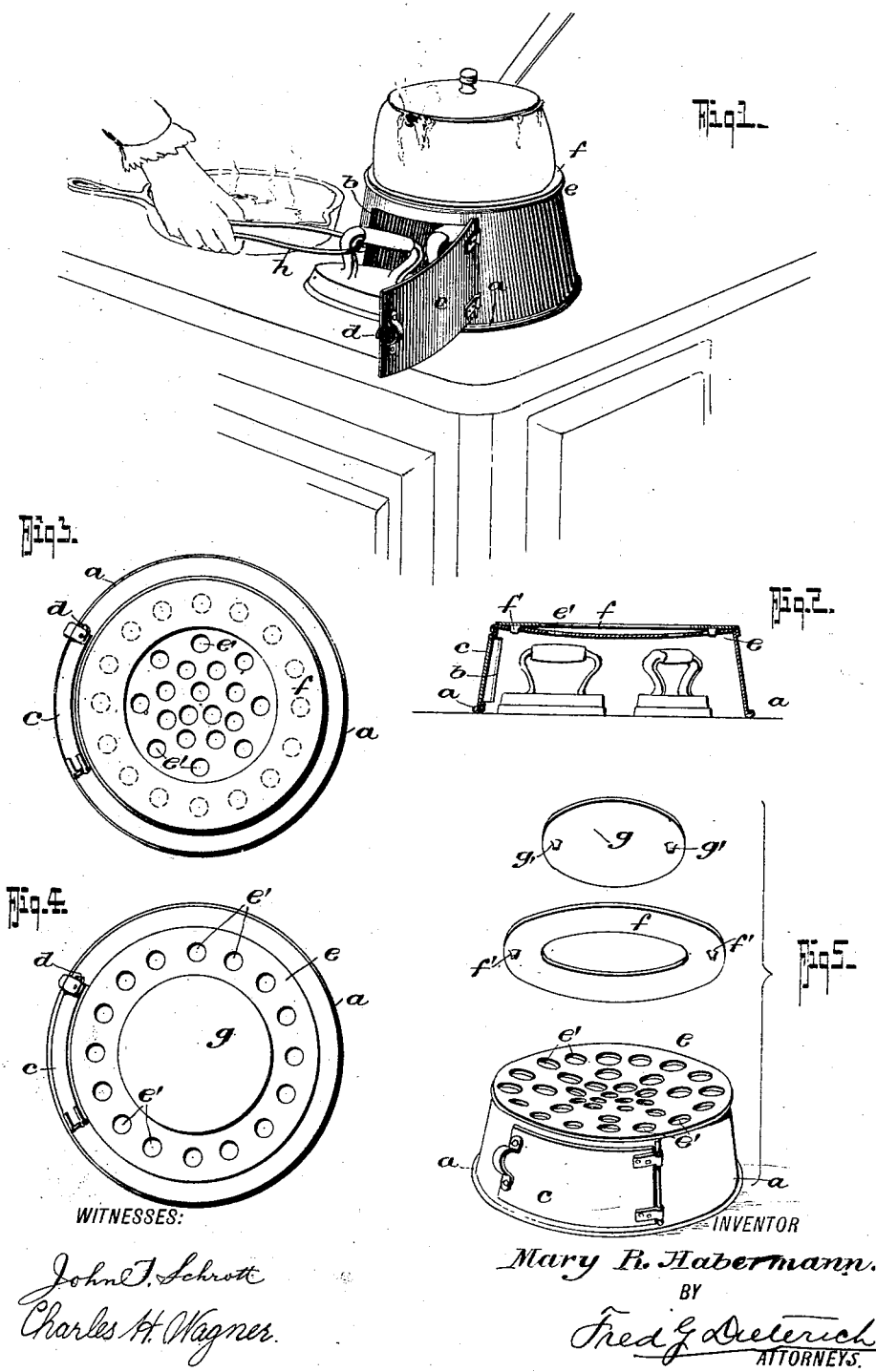

MARY R. HABERMANN, OF SUN PRAIRIE, WISCONSIN.

KITCHEN APPLIANCE.

No. 879,539.　　　Specification of Letters Patent.　　　Patented Feb. 18, 1908.

Application filed August 24, 1907. Serial No. 390,051.

*To all whom it may concern:*

Be it known that I, MARY R. HABERMANN, residing at Sun Prairie, in the county of Dane and State of Wisconsin, have invented a new and useful Kitchen Appliance, of which the following is a specification.

My invention is in the nature of a simple, economical and easily utilized appliance or utensil, particularly adapted for use in connection with small ranges, gas stoves and the like, and especially useful for single burner gas stoves, for using the heat of the burner for cooking purposes and for heating irons, whereby to enable the housekeeper to continue the use of the burner for simultaneously heating the irons and cooking.

My invention comprehends an inverted pan shaped body adapted to be set on the stove top or over the gas burner, having an opening at one side for the ready insertion and withdrawal of the irons and a perforated top that forms a rest and heating base for the cooking utensil.

In its more complete nature, my invention consists in a device of the character stated, in the nature of an inverted pan having a dished perforated top and a hinged door at the side, a circular flat annular rim adapted to be detachably seated on the top for closing the outer ones of the perforations and a solid disk or cover plate adapted to fit over and close the central apertures in the top, it also embodying a detailed arrangement of the several parts, as will be hereinafter fully described, specifically pointed out in the appended claims and illustrated in the accompanying drawing, in which:—

Figure 1, is a perspective view of my improved appliance, the door being opened to illustrate the manner in which the irons are drawn out. Fig. 2, is a cross section of the same, the door being closed. Fig. 3, is a view thereof, showing the closure rim for shutting off the outer series of holes in position on the perforated top. Fig. 4, is a similar view which shows a central covering or disk in place. Fig. 5, shows the several parts that constitute the complete appliance separated.

In its practical construction, my improvement is formed of sheet metal and has the shape of an inverted dish pan, the rim $a$ furnishing the base of the appliance and a regular bottom bearing therefor. At the side, the said top has a long opening $b$ which is normally closed by a hinged door $c$ having an extension $d$ for holding the same shut. The top $e$ of the body is dished and is formed with a large number of apertures $e'$ arranged in circular rows, as shown.

$f$ designates the flat annular rim having the diameter of the top $e$ and which is used for closing off the outer row of apertures $e'$, when it is desired to concentrate the heat to the center of the top for quick cooking, and $g$ designates a solid cover plate of a diameter to fit on the rim $f$ and which is utilized for setting on the top to cover the center holes, whereby to provide for a slow cooking, and to prevent the said rim $f$ and disk $g$ easily sliding off the top $e$, they respectively have one or more pendent lugs $f'$ $g'$ for extending down through the apertures $e'$.

The manner in which my improvement is used and its advantages, is best explained as follows: When using a single burner on one side of the range top, for heating irons when called on to quickly prepare a meal, the keeping of the irons hot for continuing the ironing while the meal is cooking is usually rendered difficult and oft times impossible.

My invention comprehends an appliance or device, capable of being portably mounted on the stove to cover the irons which become heated as usual, and by reason of being encased are heated quickly since the heat is concentrated and which I use for cooking, since the coffee pot or other utensil can be set upon the perforated top. To heat a cooking utensil quickly, I simply place the rim $f$ on the perforated top which concentrates the heat on the center of the top and when it is desired to heat the pot slowly the disk $g$ is placed on the perforated top alone or with the rim. When both the members $f$ and $g$ are on the stove top or burner, the irons will be quickly heated, since the full force of the heat is maintained within the holder. To withdraw the irons conveniently, I use a bow-shaped wire handle $h$, as shown.

What I claim is:—

1. An appliance for the purposes described, which comprises an inverted dish shaped body having an opening and a hinge closure therefor on one side and having its top dished and formed with apertures from the center to the circumference, and a solid plate adapted to detachably fit over the apertured top to close off the central apertures therein the said plate having pendent lugs for the purposes described.

2. A new article for the purposes stated.

consisting of a metal inverted dish shaped body whose top is dished and formed with apertures extending from the center to the circumference, one side of said body having an opening and a hinged closure member therefor, and a solid circular rim plate adapted to fit upon and close off the outermost ones of the apertures in the top of the body portion and a flat solid disk adapted to close off the central ones of the apertures in the said top and to fit within the circular rim, as set forth.

3. A new article for the purposes stated, which consists of a metal inverted dish shaped body whose top is dished and provided with apertures extending from the center to the circumference, one side of the said body having an opening and a hinged closure member therefor, an annular rim plate adapted to fit upon and close off the outermost ones of the apertures in the dish, top of the body portion and a flat solid disk adapted to fit within the annular rim to close off the central apertures in the dished top of the body portion, the said annular rim and the solid flat disk having pendent lugs for engaging with the apertures in the dished top, all being arranged substantially as shown and for the purposes described.

MARY R. HABERMANN.

Witnesses:
 THOS. C. HAYDEN,
 OLE KATTELSON.